United States Patent
Eyssell et al.

(10) Patent No.: US 10,974,469 B2
(45) Date of Patent: Apr. 13, 2021

(54) METHOD FOR MANUFACTURING A SEMIFINISHED PRODUCT OR A PART MADE OF METAL AND FIBER COMPOSITE

(71) Applicants: VOESTALPINE STAHL GMBH, Linz (AT); VOESTALPINE METAL FORMING GMBH, Krems an der Donau (AT)

(72) Inventors: Carola Eyssell, Luftenberg (AT); Rüdiger Heinritz, Schwäbisch Gmünd (DE); Reiner Kelsch, Mutlangen (DE); Gerhard Mayrhofer, Altenfelden (AT); Christian Rouet, Gedersdorf (AT); Johannes Riegler, Buchkirchen (AT)

(73) Assignee: voestalpine Stahl GmbH, Linz (AT)

( * ) Notice: Subject to any disclaimer, the term of this patent is extended or adjusted under 35 U.S.C. 154(b) by 379 days.

(21) Appl. No.: 16/060,985

(22) PCT Filed: Dec. 12, 2016

(86) PCT No.: PCT/EP2016/080705
§ 371 (c)(1),
(2) Date: Aug. 23, 2018

(87) PCT Pub. No.: WO2017/098060
PCT Pub. Date: Jun. 15, 2017

(65) Prior Publication Data
US 2018/0370162 A1    Dec. 27, 2018

(30) Foreign Application Priority Data
Dec. 11, 2015  (EP) .................................. 15199680

(51) Int. Cl.
*B21D 35/00* (2006.01)
*B29C 70/46* (2006.01)
(Continued)

(52) U.S. Cl.
CPC .......... *B29C 70/528* (2013.01); *B21D 22/022* (2013.01); *B21D 22/22* (2013.01);
(Continued)

(58) Field of Classification Search
CPC ...................................................... B21D 22/06
See application file for complete search history.

(56) References Cited

U.S. PATENT DOCUMENTS

2012/0291512 A1 * 11/2012 Kang ...................... B30B 15/02
72/376
2013/0242487 A1 * 9/2013 Fujioka ............. B29C 45/14811
361/679.01

(Continued)

FOREIGN PATENT DOCUMENTS

DE        19956394 A1     6/2001
DE     102014001132 A1    7/2015
(Continued)

OTHER PUBLICATIONS

M. Wacker, et al. "Sonderdrucke Härtung von Reaktionsharzen Time-Temperature-Transition-Diagramm," Jul. 18, 2013, XP055276610, Erlangen, Retrieved from the Internet: URL:http://www.lkt.uni-erlangen.de/publikationen/online-aufsaetze/ttt.pdf (retrieved on May 31, 2015), pp. 2-4, 14-19; characterized in the International Search Report.

*Primary Examiner* — Barbara J Musser

(57) ABSTRACT

A method for manufacturing a semifinished product or part is disclosed in which a metal support embodied as a metal sheet or blank is covered with at least one prepreg containing a thermally cross-linkable thermosetting matrix with endless fibers, the thermosetting matrix of the prepreg is pre-cross-linked by means of heating, and the metal support covered with the pre-cross-linked prepreg is formed into a semifinished product or part by means of deep drawing or stretch deep drawing. In order to enable plastic deformation in (Continued)

fiber-reinforced regions of the metal support, it is proposed that during the pre-cross-linking of the thermosetting matrix of the prepreg, its matrix is transferred into a viscosity state that is higher than its minimum viscosity and prior to reaching its gel point, the prepreg is formed together with the metal support.

15 Claims, 3 Drawing Sheets

(51) Int. Cl.
| | |
|---|---|
| B29C 70/52 | (2006.01) |
| B29C 70/40 | (2006.01) |
| B32B 15/092 | (2006.01) |
| B32B 15/14 | (2006.01) |
| B29C 70/08 | (2006.01) |
| B32B 5/02 | (2006.01) |
| B32B 15/20 | (2006.01) |
| B32B 3/26 | (2006.01) |
| B32B 27/08 | (2006.01) |
| B32B 27/40 | (2006.01) |
| B32B 15/18 | (2006.01) |
| B32B 19/02 | (2006.01) |
| B32B 7/12 | (2006.01) |
| B32B 27/38 | (2006.01) |
| B32B 7/04 | (2019.01) |
| B32B 19/04 | (2006.01) |
| B32B 15/095 | (2006.01) |
| B29C 70/88 | (2006.01) |
| B21D 22/02 | (2006.01) |
| B21D 22/22 | (2006.01) |

(52) U.S. Cl.
CPC .......... *B21D 35/006* (2013.01); *B21D 35/008* (2013.01); *B29C 70/088* (2013.01); *B29C 70/40* (2013.01); *B29C 70/46* (2013.01); *B29C 70/885* (2013.01); *B32B 3/26* (2013.01); *B32B 5/024* (2013.01); *B32B 5/026* (2013.01); *B32B 5/028* (2013.01); *B32B 7/04* (2013.01); *B32B 7/12* (2013.01); *B32B 15/092* (2013.01); *B32B 15/095* (2013.01); *B32B 15/14* (2013.01); *B32B 15/18* (2013.01); *B32B 15/20* (2013.01); *B32B 19/02* (2013.01); *B32B 19/041* (2013.01); *B32B 27/08* (2013.01); *B32B 27/38* (2013.01); *B32B 27/40* (2013.01); *B32B 2255/06* (2013.01); *B32B 2255/205* (2013.01); *B32B 2255/28* (2013.01); *B32B 2260/021* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2270/00* (2013.01); *B32B 2307/50* (2013.01); *B32B 2307/732* (2013.01); *B32B 2307/752* (2013.01); *B32B 2457/08* (2013.01)

(56) References Cited

U.S. PATENT DOCUMENTS

2013/0340928 A1   12/2013   Rotter et al.
2015/0298399 A1*  10/2015   Androsch ............ B29C 70/088
                                                        264/134

FOREIGN PATENT DOCUMENTS

| EP | 2647486 A1 | 10/2013 |
|---|---|---|
| WO | 2013153229 A1 | 10/2013 |
| WO | 2015052352 A1 | 4/2015 |

* cited by examiner

METHOD FOR MANUFACTURING A SEMIFINISHED PRODUCT OR A PART MADE OF METAL AND FIBER COMPOSITE

FIELD OF THE INVENTION

The invention relates to a method for manufacturing a semifinished product or part, in which a metal support embodied as a metal sheet or blank is covered with at least one prepreg containing a thermally cross-linkable thermosetting matrix with endless fibers, the thermosetting matrix of the prepreg is pre-cross-linked by heating, and the metal support covered with the pre-cross-linked prepreg is formed into a semifinished product or part by means of deep drawing or stretch deep drawing.

BACKGROUND OF THE INVENTION

In order for a metal support—namely a metal sheet or blank—that is reinforced with prepregs having a thermosetting matrix with endless fibers, to be able to undergo a forming process, particularly a deep drawing process, in as damage-free a way as possible, it is known from the prior art (WO2013/153229A1) to shift the plastic deformations in the metal support into the covering-free regions of the metal support. There are thus covering-free regions on the semifinished product or part, which limits such fiber composite-reinforced semifinished products or parts with regard to their lightweight design potential and thus their possibilities for use. In addition, this area limitation also limits the fiber length of the prepreg, which can result in reduced rigidity and strength. Also, semifinished products or parts, which were deep drawn from sheet metal blanks with prepregs that had undergone unpressurized curing until they reached blocking strength, tended to delaminate and/or to have an increased porosity in the finally cross-linked fiber composite material—which among other things, negatively affects the reproducibility of the method.

SUMMARY OF THE INVENTION

The object of the invention, therefore, is to improve a method of the type explained at the beginning with regard to its simplicity, possibilities for use, and also reproducibility. In addition, a method should be enabled that has a reduced cycle time.

The invention attains the stated object in that during the cross-linking of the thermosetting matrix of the prepreg, its matrix is transferred into a viscosity state that is higher than its minimum viscosity and prior to reaching its gel point, the prepreg is formed together with the metal support.

If, during the pre-cross-linking of the thermosetting matrix of the prepreg, its matrix is transferred into a viscosity state that is higher than its minimum viscosity and the prepreg is formed together with the metal support prior to reaching its gel point, then this can not only permit a plastic deformation of the metal support in its fiber-reinforced regions, but also significantly improve the reproducibility of the method. Specifically, the prepreg in this state can permit relative movements between its endless fibers and the metal support that correspond to the forming radii. It is thus possible to follow even tight bending radii in the sheet metal blank without having to expect breakage or delamination. The method according to the invention can therefore be used in a particularly versatile way. Surprisingly, it has also been possible to achieve the fact that through the combined forming, it is possible to significantly improve the compaction of the matrix material with the fiber structure of the endless fibers. The comparatively short exertion of force, in particular pressurization, during the deformation can be used to reduce the porosity in the fiber composite—which makes it possible to increase the laminate quality and to further reduce the risk of a delamination of the fiber reinforcement in the sheet metal blank. According to the invention, transferring the matrix into a viscosity state that is higher than its minimum viscosity and forming the prepreg together with the metal support before the gel point of the matrix is reached can thus significantly increase the reproducibility of the method. It is also possible, through the combined forming of the prepreg and the metal support, to provide a particularly fast method sequence with a short cycle time. Furthermore, in comparison to other known methods for manufacturing fiber composite semifinished products or parts, the method according to the invention does not involve any costly and/or complex-to-manage systems engineering—which in addition to reducing the costs for the method according to the invention, also yields an improvement in its reproducibility.

In general, it is noted that the metal support can be composed of sheet metals containing an iron, aluminum, or magnesium material, a light alloy or the like, or alloys thereof. The metal support can be embodied in the form of a steel plate with or without a protective coating, for example a zinc-based one.

In general, it is also noted that the thermosetting plastic matrix can have a combination with inorganic or organic reinforcing fibers, such as glass, basalt, carbon, or aramid. It is also conceivable for the metal support to be covered with a plurality of prepregs placed next to one another as well as a stacking of prepregs (single-layer or multilayer) on the metal support. The fibers contained in the prepreg can be in the form of a purely unidirectional layer. It is thus possible to use multilayer prepregs to produce a unidirectional or multidirectional laminate on the metal support.

It is also generally noted that a thermosetting plastic matrix can also have modified thermosetting polymer blends that are preferably composed of phases, which are made up of epoxy and polyurethane phases and are not necessarily cross-linked with one another. Known percentage compositions of such a PU-epoxy blend include, for example, 5 to 25 parts of the primary polyurethane phase surrounded by an epoxy matrix.

It is also generally noted that the viscosity of the matrix is determined under oscillation using a rheometer, namely an Anton Paar MCR 301 viscometer (e.g.: plate/plate configuration, diameter 25 mm; gap 1000 µm; amplitude 0.5%; angular frequency 10 rad/s), evaluated in accordance with ASTM D 4473 08/2016.

In order to reduce the risk of the thermosetting matrix, which has been heated above the viscosity minimum, being squeezed out from the prepreg in an unwanted fashion during the forming, it is possible for the degree of cross-linking of the thermosetting matrix to be set to 4 to 15% before the forming (e.g.: by means of temperature and/or time).

It can be particularly advantageous if during the forming, the degree of cross-linking of the thermosetting matrix is set to 20 to 45% (e.g.: by means of temperature and/or time). It is thus possible to additionally reduce the risk of the thermosetting matrix being squeezed out in an unwanted fashion during the forming. Also, with such a degree of cross-linking, the exertion of pressure on the prepreg during the forming can insure optimal conditions for achieving an increased laminate quality of the prepreg. This can also be beneficial to the adhesive strength between the material partners.

It can be particularly advantageous if during the forming, the degree of cross-linking of the thermosetting matrix is set to 25 to 40% (e.g.: by means of temperature and/or time).

If during the forming, the thermosetting matrix is heated to 120 to 220° C., then the cross-linking can be accelerated—thus making it possible for the forming to occur more quickly and for the cycle time of the method to be reduced.

It can be particularly advantageous if during the forming, the thermosetting matrix is heated to 150 to 180° C.

An unwanted cooling of the heated prepreg—and thus a change in the temperature that is disadvantageous for the method according to the invention—can be prevented if the forming tool is heated and the metal support is formed by the heated forming tool. In this way, the reproducibility of the method can be increased even more. It has been determined that for this purpose, the temperature of the forming tool can be different from the temperature of the prepreg or more precisely its matrix. It is also conceivable for the tools of the forming tool to have different temperatures in order to selectively temper the metal support in a region-specific way or to establish a temperature gradient in the laminate.

The cycle times for the forming can be reduced if after the combined forming, the prepreg undergoes unpressurized curing together with the metal support—and because of this, the forming tool can be removed again particularly quickly.

Because an intermediate layer, which bonds the prepreg to the metal support, is applied to the metal support before or during the covering of the metal support with the prepreg, it is possible on the one hand to improve the adhesive strength and on the other hand to also exert a compensating influence on thermal stresses. This intermediate layer should be applied all over, at least in the region of the metal support that is also covered with prepreg.

The layer thickness of the intermediate layer can preferably be from 50 μm to 1000 μm, with layer thicknesses of 80 μm to 700 μm being preferable. Thicker layers, preferably layer thicknesses of 500 μm to 1000 μm can prove advantageous due to the fact that they also provide a protection from corrosion (barrier layer). In applications with high rigidity requirements, thin films are preferable (preferably <150 μm). Furthermore, the processing time, i.e. the reaction time, is relevant—which must be taken into account above all with shorter cycle times. It has turned out that intermediate layers based on polyethylene, polypropylene, and/or with a polyamide core or also co-polyamide-based intermediate layers can be particularly well-suited in this connection. These can, for example, be systems from the company Nolax, namely the products Cox 391, Cox 422, and Cox 435, systems from the company Evonik, namely the product Vestamelt X1333-P1, or systems from the company Hexcel, namely the products TGA25.01A and DLS 1857.

In order to insure a high laminate quality, it is possible that during the forming, a compressive force is exerted on the matrix of the prepreg. Such an exertion of pressure can, for example, be produced if the metal support, which is composed of sheet metal and covered with prepreg, is formed by means of deep drawing or stretch deep drawing. The metal support—for example produced by transverse division of a metal strip—can also be embodied as a flat sheet or blank.

A crease formation or fiber distortion in the prepreg can be prevented if during the forming, the prepreg is held down on the metal support in some regions and is thus affixed to the metal support there. By means of this local affixing of limited regions of the metal support that are covered with prepreg, which according to the invention can take place with the aid of a female die insert, the prepreg can for example permit a movement in other directions in accordance with the respective orientation of its endless fibers. In this connection, it is also conceivable for the forming tool to have a plurality of such hold-down devices. A hold-down device of this kind can also be achieved by means of a local reduction in tool gap, for example between the female die and the male die.

The risk of a crease formation or fiber distortion can be further reduced if, during the forming, the prepreg is engaged in a forming way by segments or groups of segments of a female die and/or male die of the forming tool. It is thus possible to achieve a delayed action of the forming tool on the prepreg—thus permitting the prepreg to follow the plastic deformations of the metal support in an improved way.

If in the course of the forming procedure, the engagement region widens out in segments or groups of segments toward an edge of the metal support, then it is possible to elegantly press out any creases in the prepreg or air inclusions contained therein in the direction toward an edge of the metal support. With the aid of the forming tool, it is thus possible to do without a subsequent smoothing of the prepreg.

In order to facilitate the deep drawing or also stretch deep drawing, it is possible for the metal support to be covered in some regions with at least one prepreg. This can further increase the reproducibility of the method.

The above advantages can occur particularly if 20 to 40% of one of the flat sides of the metal support is covered with prepreg.

In particular, the method according to the invention can be suitable for manufacturing a structural component of a vehicle. In general, it is noted that a structural component can be a component of a load-bearing structure of a vehicle, in particular a motor vehicle, a road vehicle, a transport vehicle, a railway vehicle, an aircraft, or a space vehicle. A structural component can, for example, be a side sill, an A-pillar, a B-pillar, a C-pillar, a cross beam, or a longitudinal beam.

BRIEF DESCRIPTION OF THE DRAWINGS

The method for manufacturing a semifinished product or part according to the invention is shown in greater detail in the figures by way of example. In the drawings.

DETAILED DESCRIPTION OF THE PREFERRED EMBODIMENTS

Figure 1:
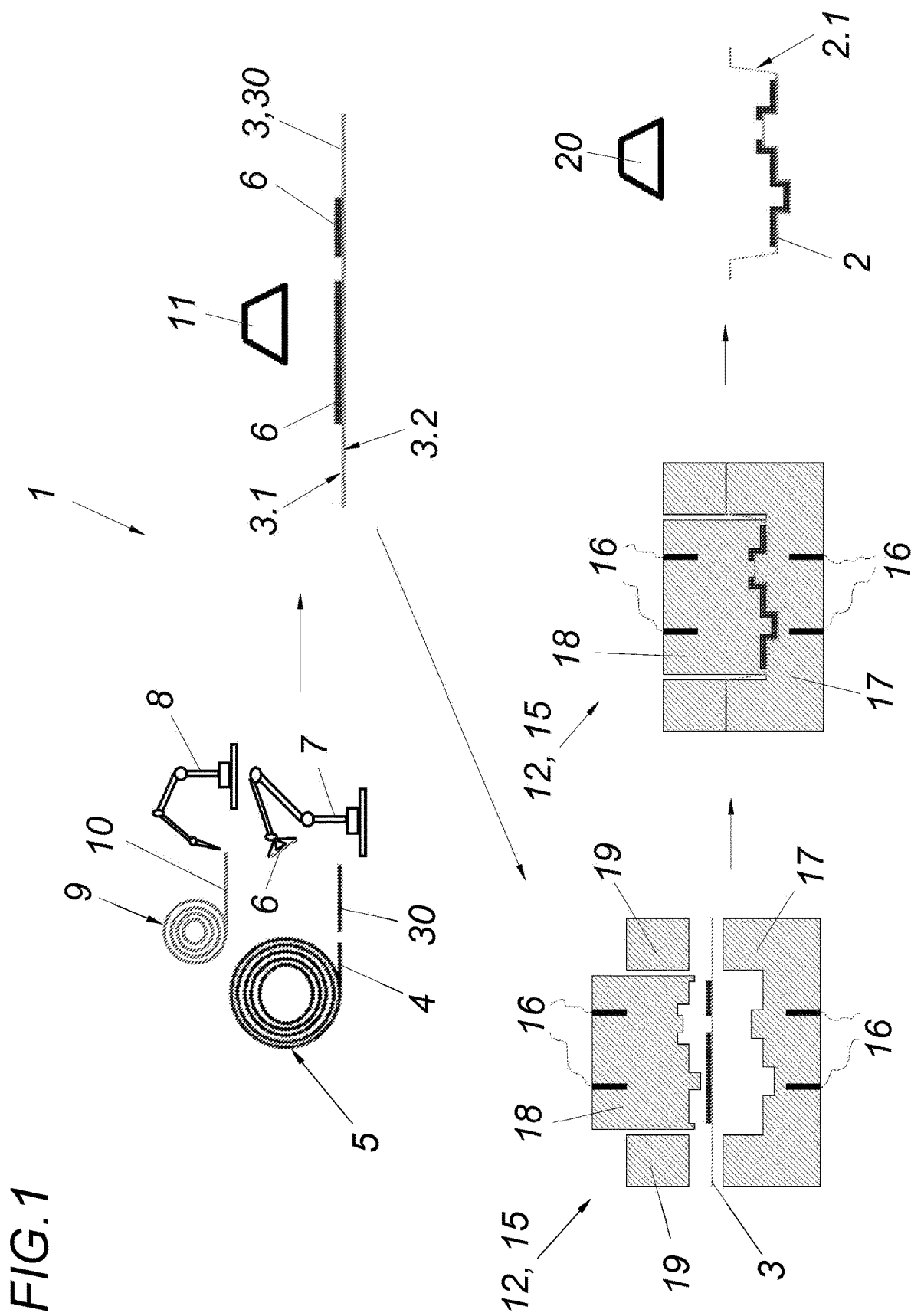
FIG. 1 shows a sequence of the method according to the invention in which a deep drawing tool is used to form a metal support that is covered with prepreg.

According to the sequence shown in FIG. 1 for the method according to the invention 1 for manufacturing a component 2 such as a structural component 2.1 of a vehicle, in the first step, a metal support 3 embodied in the form of a sheet metal blank 3, namely a blank 30, is produced by transverse division from a metal strip 4 taken from a coil 5.

Of the two flat sides 3.1, 3.2, on one flat side 3.1 that is to be covered with prepreg 6, the metal support 3 is optionally cleaned further and/or chemically treated in advance—but this is not shown in detail. Then the metal support 3 is covered with a plurality of prepregs 6 by means of a robot 7. The metal support 3 can possibly be preheated for this.

For example, in order to cut the prepreg 6 to size, a robot 8 is provided, which has cutting devices that are not shown in detail, for example an ultrasonically excited blade, for cutting this woven/nonwoven/meshwork/knit/crocheted, etc. fabric 10 (fiber composite) that has been pre-impregnated with plastic matrix and wound onto a roll 9. In the exemplary embodiment, the woven/nonwoven/meshwork/knit/crocheted, etc. fabric 10 composed of endless fibers has already been impregnated with a thermally cross-linkable thermosetting matrix.

But it is generally also conceivable—though not shown—for the metal support 3 to be covered with preconditioned prepregs 6, for example in an automated fashion as shown in FIG. 1 and/or by hand. These prepregs 6—for example piled into a stack—can already be preconditioned in their dimensions, in the density, in the number of layers, and/or with an intermediate layer, etc.

After this covering step, the thus covered metal support 3 is irradiated with a heat source 11—and the cross-linking of the matrix is thus selectively set. This cross-linking of the matrix takes place without pressurization and, when using a pre-impregnated woven/nonwoven/meshwork/knit/crocheted, etc. fabric 10, is carried out by heating it to 80° C. to 200° C., preferably 100° C. to 180° C., with a heating rate of 1 to 40° C./min, preferably 5 to 25° C./min, in order to thus set a degree of cross-linking a of 4 to 15% prior to the forming. Instead of a heat source 11 embodied in the form of an IR or NIR emitter, it is also conceivable to use a continuous furnace, for example, but this is not shown in detail in the exemplary embodiment.

Then the covered metal support 3 is placed into a forming tool 12 and formed.

Figure 2:
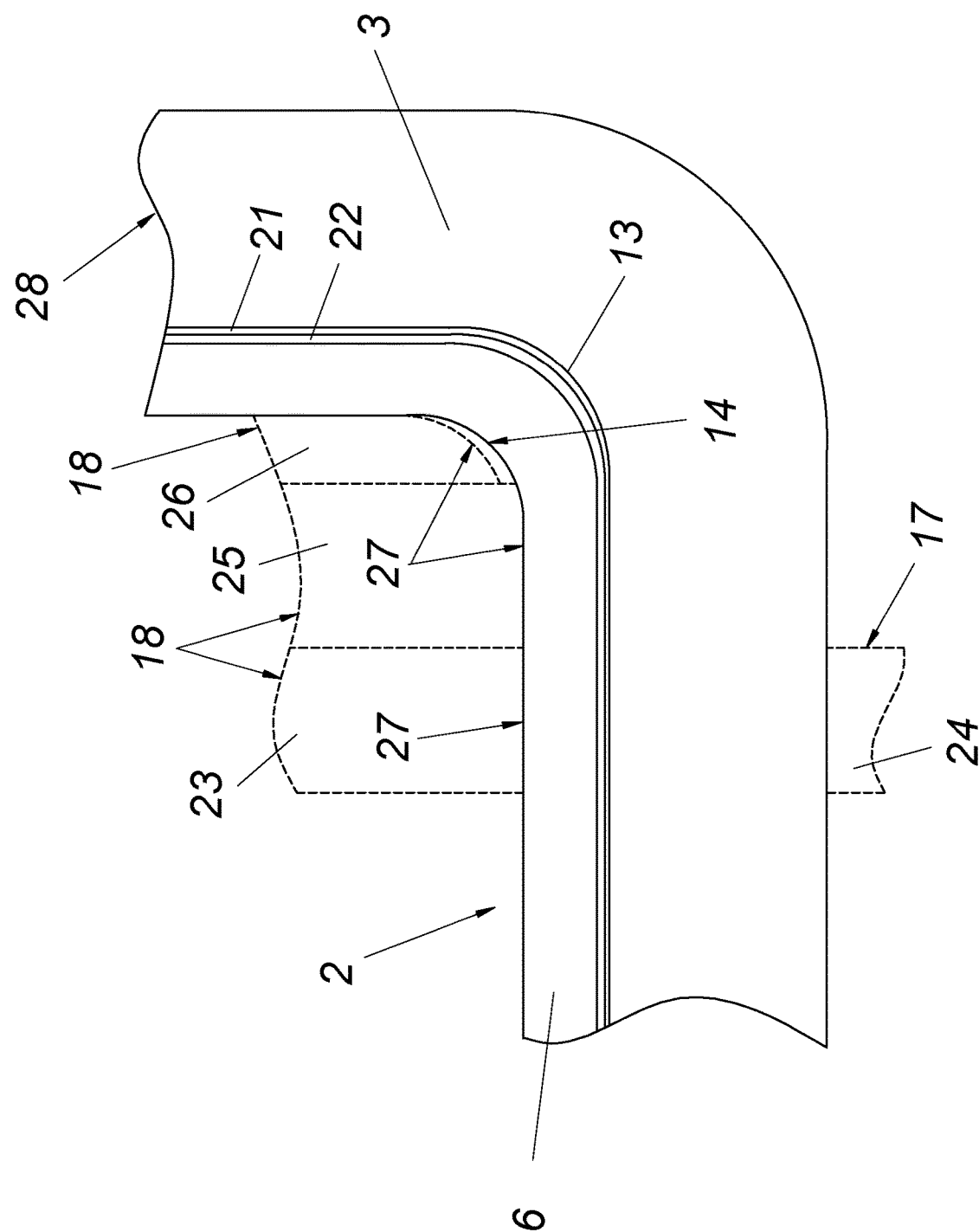
FIG. 2 shows a cut-away enlarged sectional view of a semifinished product manufactured according to the method shown in FIG. 1.
Figure 3:
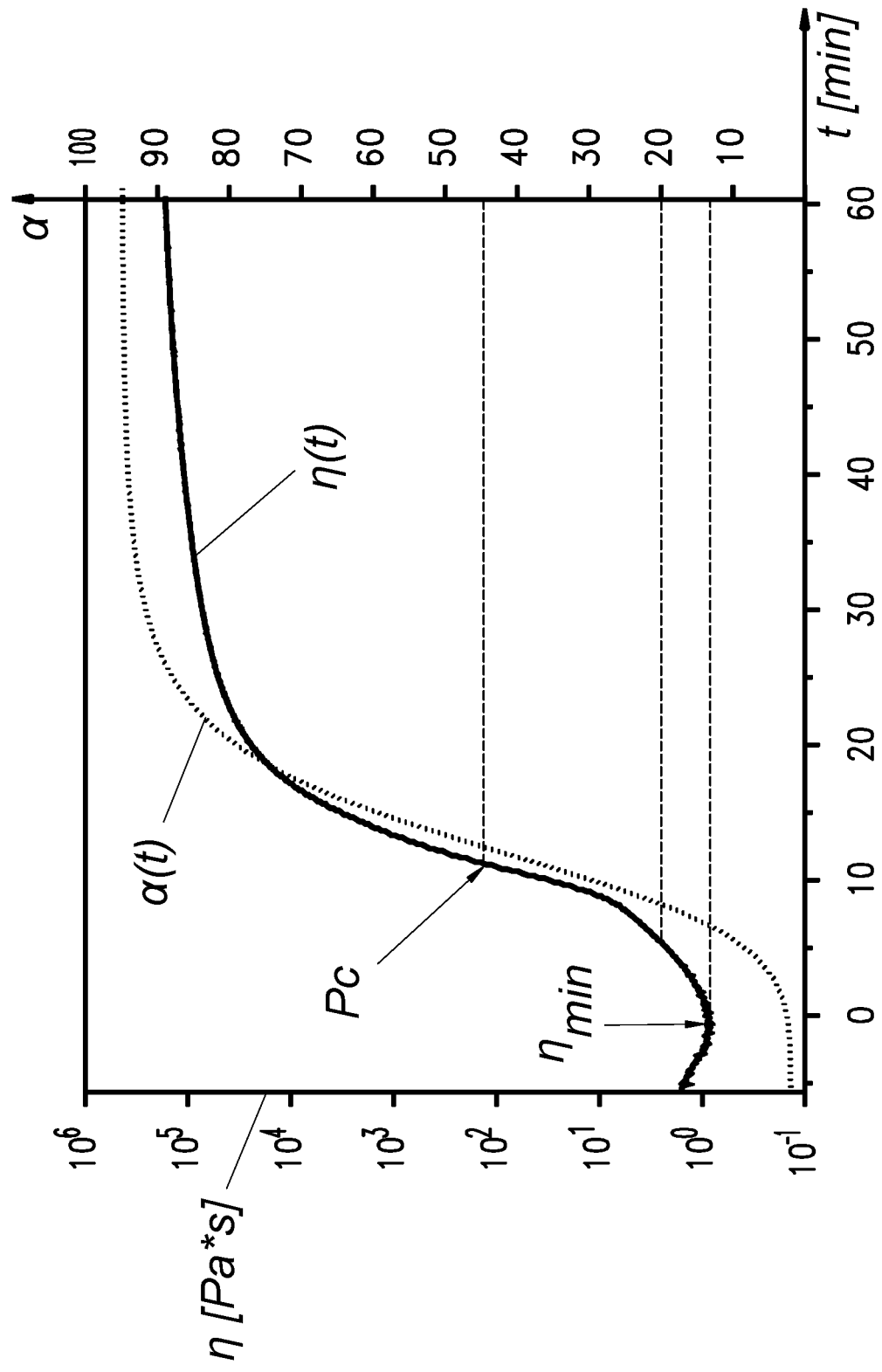
FIG. 3 shows a time-dependent representation of the viscosity and the degree of cross-linking of the matrix of the prepreg that is used in the method according to FIGS. 1 and 2.

According to the invention, this forming takes place in coordination with the pre-cross-linking of the thermosetting matrix of the prepreg 6, as indicated in FIG. 3. To this end, this matrix is transferred into a viscosity state q that is higher than its minimum viscosity $\eta_{min}$ and prior to reaching its gel point Pc, is formed together with the metal support 3 with the aid of the forming tool 12. For this purpose, the forming tool 12 is moved from an open position into a closed position. The advantageous combined forming of the thermosetting matrix with the metal support 3 is possible according to the invention because the prepreg 6, which is used in the state according to the invention, is able to follow the plastic shape changes brought about by the forming. Specifically, the endless fibers of the prepreg 6 are still able to move in the prepreg 6 relative to the metal support 3. The matrix of the prepreg 6 is in a viscosity state η that is higher than its minimum viscosity $\eta_{min}$, as a result of which no breakage of the endless fibers or delamination of the fiber reinforcement on the metal support 3 occurs during the forming—as shown in greater detail in FIG. 2. According to the invention, this enables a combined forming with bending radii 13 on the metal support 3, both in its regions that are free of prepreg 6 and in its regions 14 that are covered with prepreg 6.

As shown in FIG. 1, the metal support 3 is thus covered with prepreg 6 only in some regions, specifically up to 20% to 40% on one flat side 3.1, which significantly facilitates the combined forming. The region 14 of the flat side 3.1 that is covered with prepreg 6 is thus smaller in area than the entire area of the flat side 3.1.

The depiction according to FIG. 3 relates to the following fiber composite material:
Metal support: Steel sheet: sheet thickness 0.81 mm
Laminate: Unidirectional, four layers of prepreg
Prepreg: Endless fibers with a fiber content of 57% in the matrix
Thickness: 0.22 mm
Matrix: Thermosetting base (SGL Type E201: modified epoxy resin system)
$\eta_{min}$=0.9 Pa*s
Pc=45%
Intermediate layer: 100 μm polypropylene The degree of cross-linking a of the matrix was determined by means of differential scanning calorimetry (DSC) measured in accordance with ISO 11357-5:2013.

Instead of a steel sheet, it is also conceivable to use a sheet composed of an aluminum alloy such as the 6xxx series.

According to FIG. 1, the forming tool 12 is depicted, for example, as a deep drawing tool for forming or deep drawing the covered metal support 3. It is also quite conceivable, however, for the metal support 3 to undergo a combined stretching and deep drawing with a forming tool that is not shown.

In order to reduce the risk of the thermosetting matrix of the prepreg 6 being squeezed out during the forming, this matrix is pre-cross-linked to 4 to 15%, as mentioned above, before the forming tool 12 exerts forces on the prepreg 6—which as shown in FIG. 1 occurs when the forming tool 12 is moved from its open position into its closed position. In general, it should be noted that differential scanning calorimetry (DSC), particularly the isothermal method according to ISO 11357-5:2013, can be suitable for measuring the cross-linking.

In the heated forming tool 12, the degree of cross-linking a of the matrix, starting from 4 to 15% before the forming, is set to 20 to 45%, preferably 25 to 40%, during the forming, which 20 to 45% limits are shown with dashed lines in FIG. 3. Such a setting can, for example, be carried out by means of temperature and/or time. After this, the component 2 is removed from the forming tool 12. Preferably, the removal of the component 2 from the forming tool 12 takes place once the gel point of the respective matrix is reached or thereafter. In comparison to known methods, this enables a sharply reduced cycle time while achieving a similar laminate quality in the prepreg 6 and insures the sufficient inherent stability of the matrix system with the fibers.

With a heated, i.e. selectively temperature-controlled, forming tool 12, it is also possible to insure that during the forming, the thermosetting matrix is kept at a temperature of 120 to 220° C. in order to be able to remove the component 2 from the forming tool earlier due to the quicker cross-linking and to be able to thus shorten the process. A temperature of 150 to 180° C. has proven advantageous in many ways. In order to heat the forming tool 12 or deep drawing tool 15, it is equipped with an electric heating unit 16, which heats the female die 17 and male die 18 of the forming tool 12. A heating unit for the hold-down device 19 is not shown, but it is also conceivable for one to be provided. For example, through differently temperature-controlled regions, a temperature gradient can be established in the matrix or more specifically in the prepreg 6 in order to be able to precisely establish physical and chemical parameters—such as adhesive strength, viscosity state q, etc.

After the forming, the component 2 is removed from the forming tool 12 and the matrix of the prepreg 6 undergoes further unpressurized curing outside of the forming tool 12—specifically with another heat source 20, which is shown in FIG. 1. It is once again conceivable among other things to use a continuous furnace, not shown, for this purpose. Preferably, this additional curing by means of the heat source 20 is carried out with a temperature of 100 to 200 degrees Celsius (° C.) in order to thus reduce inherent stresses, for example, arising from the subsequent cooling to room temperature. A temperature of 120 to 150° C. has proven advantageous in many ways.

The metal support 3 that is to be covered also has, among other things, a protective coating 21 such as a zinc or zinc alloy coating—as can be seen in FIG. 2. In the region that is covered all over with the prepreg 6, an intermediate layer 22 is placed onto this protective coating 21, i.e. onto the flat side of the metal support 3. This intermediate layer 22 is produced by applying a polyamide-based coupling agent onto the metal support 3. By means of this intermediate layer 22, the prepreg 6 can be bonded to the metal support 3 in an extremely strong and low-stress way.

During the forming, the prepreg 6 is held down against the metal support 3 in some regions and is thus affixed to the metal support 3 there—as shown in FIG. 2. The segment 23 of the female die 17 presses the prepreg 6 against the metal support 3, which is stabilized in this region by means of a backstop 24 of the female die 17. This avoids crease formation and fiber distortion in the prepreg.

During the forming, the prepreg 6 also remains in the forming engagement with successively acting segments 25, 26 of the female die 17 of the forming tool 12. This can be seen in FIG. 2 from the fact that by contrast with segment 25, one segment 26 of the female die 17 is not yet fully resting against the prepreg 6. It is also clear from the sequence of segments 25, 26 that in the course of the forming process, the engagement region 27 widens out segment by segment toward the edge 28 of the metal support 3. As a result, by means of the segmented forming tool 12, a kind of smoothing of the prepreg can be enabled, which reproducibly prevents the formation of creases and air inclusions in the prepreg.

The invention claimed is:

1. A method for manufacturing a semifinished product or part, comprising:
    covering a metal support embodied as a metal sheet or blank with at least one prepreg containing a thermally cross-linkable thermosetting matrix with endless fibers,
    pre-cross-linking the thermosetting matrix of the prepreg by heating, and forming the metal support covered with the pre-cross-linked prepreg into a semifinished product or part by deep drawing or stretch deep drawing with a forming tool holding the metal sheet or blank with a hold-down device,
    wherein
        during the pre-cross-linking of the thermosetting matrix of the prepreg, the matrix of the prepreg is transferred into a viscosity state that is higher than a minimum viscosity of the matrix and prior to reaching a gel point of the matrix, the prepreg is formed together with the metal support.

2. The method according to claim 1, wherein before the forming, the degree of cross-linking of the thermosetting matrix is set to 4 to 15%.

3. The method according to claim 1, wherein during the forming, the degree of cross-linking of the thermosetting matrix is set to 20 to 45%.

4. The method according to claim 3, wherein during the forming, the degree of cross-linking (a) of the thermosetting matrix is set to 25 to 40%.

5. The method according to claim 1, wherein during the forming, the thermosetting matrix is heated to 120 to 220° C.

6. The method according to claim 5, wherein during the forming, the thermosetting matrix is heated to 150 to 180° C.

7. The method according to claim 1, comprising heating the forming tool and forming the metal support by the heated forming tool.

8. The method according to claim 1, wherein after the combined forming of the semifinished product or part, the prepreg undergoes unpressurized curing together with the metal support.

9. The method according to claim 1, comprising, before or during the covering of the metal support with the prepreg, applying an intermediate layer to the metal support, which bonds the prepreg to the metal support.

10. The method according to claim 1, wherein during the forming, the prepreg is held down on the metal support in some regions and is thus affixed to the metal support in those regions.

11. The method according to claim 10, wherein during the forming, the prepreg is engaged in a forming way by segments or groups of segments of a female die and/or a male die of the forming tool.

12. The method according to claim 11, wherein in the course of the forming procedure, an engagement region widens out in the segments or the groups of segments toward an edge of the metal support.

13. The method according to claim 1, comprising covering the metal support in some regions with the at least one prepreg.

14. The method according to claim 13, wherein 20 to 40% of a flat side of the metal support is covered with the at least one prepreg.

15. The method according to claim 1 comprising manufacturing a structural component of a vehicle.

* * * * *

UNITED STATES PATENT AND TRADEMARK OFFICE
CERTIFICATE OF CORRECTION

PATENT NO. : 10,974,469 B2
APPLICATION NO. : 16/060985
DATED : April 13, 2021
INVENTOR(S) : Carola Eyssell et al.

Page 1 of 1

It is certified that error appears in the above-identified patent and that said Letters Patent is hereby corrected as shown below:

On the Title Page

Item (73), "voestalpine Stahl GmbH, Linz (AT)" should read --voestalpine Stahl GmbH, Linz (AT); voestalpine Metal Forming GmbH, Krems an der Donau (AT)--.

In the Specification

Column 5, Line 33, "cross-linking a" should read --cross-linking α--.

Column 5, Line 44, "q" should read --ŋ--.

Column 6, Line 16, "cross-linking a" should read --cross-linking α--.

Column 6, Lines 37-38, "cross-linking a" should read --cross-linking α--.

Column 6, Line 67, "q" should read --ŋ--.

In the Claims

Column 8, Claim 4, Line 15, "cross-linking (a)" should read --cross-linking (α)--.

Signed and Sealed this
Seventh Day of March, 2023

Katherine Kelly Vidal
*Director of the United States Patent and Trademark Office*